(12) United States Patent
Kim et al.

(10) Patent No.: US 10,001,044 B2
(45) Date of Patent: Jun. 19, 2018

(54) EXHAUST GAS POST-PROCESSING APPARATUS AND CONTROL METHOD THEREFOR

(71) Applicant: Doosan Infracore Co., Ltd., Incheon (KR)

(72) Inventors: Ji Seok Kim, Incheon (KR); Seung Eun Moon, Incheon (KR); Tae Hyung Kim, Incheon (KR); Nam Il Choi, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days. days.

(21) Appl. No.: 15/107,284

(22) PCT Filed: Dec. 24, 2014

(86) PCT No.: PCT/KR2014/012835
§ 371 (c)(1),
(2) Date: Jun. 22, 2016

(87) PCT Pub. No.: WO2015/099458
PCT Pub. Date: Jul. 2, 2015

(65) Prior Publication Data
US 2016/0369682 A1    Dec. 22, 2016

(30) Foreign Application Priority Data

Dec. 24, 2013  (KR) .................. 10-2013-0162756

(51) Int. Cl.
*F01N 3/08*  (2006.01)
*F01N 9/00*  (2006.01)
*F01N 3/20*  (2006.01)

(52) U.S. Cl.
CPC ........... *F01N 9/002* (2013.01); *F01N 3/0885* (2013.01); *F01N 3/208* (2013.01); *F01N 9/00* (2013.01);
(Continued)

(58) Field of Classification Search
CPC .......... F01N 3/0885; F01N 3/208; F01N 9/00; F01N 9/002; F01N 2260/04;
(Continued)

(56) References Cited

U.S. PATENT DOCUMENTS

2007/0056267 A1* 3/2007 Handler .................. F01N 9/00
60/286
2008/0072580 A1  3/2008 Nagaoka et al.
(Continued)

FOREIGN PATENT DOCUMENTS

CN   1012988445      11/2008
CN   103133108 A     6/2013
(Continued)

OTHER PUBLICATIONS

International Search Report (with English translation) issued in international application No. PCT/KR2014/012835, dated Mar. 16, 2015, 5 pages.
(Continued)

*Primary Examiner* — Brandon Lee
(74) *Attorney, Agent, or Firm* — K & L Gates LLP

(57) ABSTRACT

The present disclosure relates to an exhaust gas post-processing apparatus and a control method therefore. The exhaust gas post-processing apparatus and the control method therefore according to the present disclosure are provided with a pressure sensor on an exhaust gas line and a sensor on front/rear ends of the exhaust gas post-processing apparatus which can measure the concentration and the quantity of nitrogen oxides. Consequently, forced regenera-
(Continued)

tion of the exhaust gas post-processing apparatus can be performed by determining whether the back pressure is increased or whether the reduction efficiency of nitrogen oxides becomes poor.

6 Claims, 2 Drawing Sheets

(52) U.S. Cl.
CPC ...... *F01N 2260/04* (2013.01); *F01N 2430/00* (2013.01); *F01N 2560/026* (2013.01); *F01N 2560/06* (2013.01); *F01N 2560/08* (2013.01); *F01N 2560/14* (2013.01); *F01N 2610/02* (2013.01); *F01N 2900/0416* (2013.01); *F01N 2900/1404* (2013.01); *F01N 2900/1406* (2013.01); *F01N 2900/1621* (2013.01); *Y02T 10/24* (2013.01); *Y02T 10/47* (2013.01)

(58) Field of Classification Search
CPC ........... F01N 2430/00; F01N 2560/026; F01N 2560/06; F01N 2560/08; F01N 2560/14; F01N 2610/02; F01N 2900/0416; F01N 2900/1404; F01N 2900/1406; F01N 2900/1621; Y02T 10/24; Y02T 10/47
See application file for complete search history.

(56) References Cited

U.S. PATENT DOCUMENTS

| | | | |
|---|---|---|---|
| 2008/0271440 A1* | 11/2008 | Xu | B01D 53/9431 60/295 |
| 2011/0061363 A1 | 3/2011 | Levijoki et al. | |
| 2013/0276428 A1 | 10/2013 | Levijoki et al. | |

FOREIGN PATENT DOCUMENTS

| CN | 103388513 A | 11/2013 |
|---|---|---|
| KR | 10-2007-0003322 A | 1/2007 |
| KR | 10-2012-0006238 A | 1/2012 |
| KR | 10-2012-0081372 A | 7/2012 |

OTHER PUBLICATIONS

Written Opinion issued in international application No. PCT/KR2014/012835, dated Mar. 16, 2015, 6 pages.
Extended European Search Report issued in related European Patent Application No. 14874595.3 dated Jul. 8, 2017.
Office Action issued in related Chinese Patent Application No. 201480070981.5 dated Dec. 20, 2017.

\* cited by examiner

EXHAUST GAS POST-PROCESSING APPARATUS AND CONTROL METHOD THEREFOR

CROSS REFERENCE TO RELATED APPLICATIONS

The present application is a National Stage of International Application No. PCT/KR2014/012835, filed Dec. 24, 2014, which claims priority to Korean Patent Application No. 10-2013-0162756, filed on Dec. 24, 2013, the entire contents of each of which are being incorporated herein by reference.

TECHNICAL FIELD

The present disclosure relates to an exhaust gas post-processing apparatus and a control method therefore, and more particularly, to an exhaust gas post-processing apparatus which is operated in a regeneration mode when an erroneous back pressure is formed on an exhaust gas line or a conversion rate of nitrogen oxides is low and a control method therefore.

BACKGROUND ART

Generally, an exhaust gas which is discharged from a diesel engine contains a contaminant. More specifically, the contaminant may be nitrogen oxides (NOx) and a particulate matter (PM).

The above mentioned contaminant contaminates the atmosphere such that the contaminant is required to be purified before being discharged to the atmosphere. According to the related art, a technique which purifies the contaminant using an exhaust gas post-processing apparatus is known.

The exhaust gas post-processing apparatus of the related art is provided with a diesel oxidation catalyst (DOC) and a selective catalytic reduction (SCR) in an exhaust gas line.

The diesel oxidation catalyst (DOC) removes carbon monoxide (CO) and hydrocarbon (HC) contained in the exhaust gas and oxidizes nitrogen oxides (NO) in the exhaust gas to be nitrogen dioxide ($NO_2$).

The selective catalytic reduction (SCR) sprays a reducing agent (urea aqueous solution) to the exhaust gas to mix the exhaust gas and the reducing agent. Thereafter, a thermal decomposition process is performed under a high temperature environment to reduce nitrogen oxides into nitrogen and water vapor.

During this process, the reducing agent (urea aqueous solution) is excessively sprayed in a low temperature operating area where an activity of the SCR catalyst is low so that the reducing agent is deposited in an exhaust gas pipe and a mixer to be solidified. However, the reducing agent and the exhaust gas are not uniformly mixed due to irregular flowing of the exhaust gas caused by an excessively generated deposit. Therefore, targeted efficiency of converting the nitrogen oxides is lowered and a back pressure due to the deposit is increased, which results in lowering the performance of the engine.

Therefore, in order to maintain the performance of the selective catalytic reduction (SCR), a regeneration operation which removes a reducing agent which is deposited in the pipe to be solidified needs to be performed.

According to the regeneration operation, a temperature of the exhaust gas is increased up to hundreds degrees Celsius so that the solidified reducing agent may be thermally analyzed. As a method for increasing the temperature of the exhaust gas, it is known to increase an engine RPM or perform an overloading job. Further, a fuel is sprayed to an upstream of the exhaust gas post-processing apparatus to forcibly increase the temperature of the exhaust gas.

The above-described regeneration operation may be performed according to a set schedule or forced regeneration may be manually performed in accordance with an intention of an operator.

Further, when a specific environment is developed, the regeneration operation is automatically performed. For example, when an increased back pressure of the exhaust gas is detected, as described above, the temperature of the exhaust gas is increased.

However, even though the regeneration operation is performed according to a set schedule or the forced regeneration is performed in accordance with the intention of the operator, when the environment where the regeneration is necessary is developed, the regeneration needs to be automatically performed.

A pressure sensor is provided on the exhaust gas line, more specifically, at the upstream of the diesel oxidation catalyst (DOC) and it is checked whether a back pressure is formed using the pressure. However, when the pressure sensor is not normally operated, the automatic regeneration is not performed.

A background art of the exhaust gas post-processing apparatus is disclosed in the following Patent Document.

CITATION LIST

Patent Document 1: Korean Unexamined Patent Application Publication No. 10-2012-0081372 (published on Jul. 19, 2012).

DISCLOSURE

Technical Problem

The present disclosure has been made in an effort to provide an exhaust gas post-processing apparatus which provides a pressure sensor at an upstream of a diesel oxidation catalyst to remove a reducing agent deposited and solidified in an exhaust gas pipe and a mixer and performs forced regeneration when a back pressure is increased as a result of checking whether a back pressure is formed by the pressure sensor or a conversion efficiency of the nitrogen oxides calculated by a difference of nitrogen oxides sensors provided in an upstream of the diesel oxidation catalyst and a rear end of the selective catalyst reduction is lowered and a control method therefore.

Technical objects to be achieved in the present disclosure are not limited to the aforementioned technical objects, and other not-mentioned technical objects will be obviously understood by those skilled in the art from the description below.

Technical Solution

The exemplary embodiment of the present disclosure provides an exhaust gas post-processing apparatus including a selective catalyst reduction device 30 provided in an exhaust gas line 10 including a first sensor S2 which is provided at an upstream of the selective catalyst reduction device 30 to measure nitrogen oxides contained in the exhaust gas; a second sensor S3 which is provided at a rear end of the selective catalyst reduction device 30 to measure nitrogen oxides contained in the exhaust gas; and a control unit 40 which calculates a reduction efficiency of nitrogen oxides by a difference between a concentration of the nitrogen oxides detected in the first sensor S2 and a concentration of the nitrogen oxides detected in the exhaust gas when the reduction efficiency is lower than a predetermined reduction efficiency.

The apparatus may further include a third sensor S1 provided at the upstream of the selective catalyst reduction device 30 to measure a pressure of the exhaust gas. Herein, the control unit 40 may additionally send a control command to increase the temperature of the exhaust gas in accordance with the pressure value measured by the third sensor S1.

The apparatus may further a fourth sensor S4 which detects a temperature of the exhaust gas at the upstream of the selective catalyst reduction device 30. The control unit 40 may additionally send a control command to increase the temperature of the exhaust gas until the temperature of the exhaust gas detected by the fourth sensor S4 reaches a target temperature.

The control unit 40 may additionally send a control command to increase the temperature of the exhaust gas during a predetermined time.

Another exemplary embodiment of the present disclosure provides a control method for an exhaust gas post-processing apparatus, including a first step S10 of measuring a concentration of oxidation or a concentration of nitrogen oxides at front/rear ends of a selective catalyst reduction device 30, and calculating a difference of concentrations of nitrogen oxides at the front/rear ends to calculate a reduction efficiency of nitrogen oxides; a second step S20 of comparing the calculated reduction efficiency of nitrogen oxides and a predetermined reduction efficiency; and a third step S30 of sending a control command to increase the temperature of the exhaust gas when the reduction efficiency of nitrogen oxides is lower than the predetermined reduction efficiency.

The method may further include a fourth step S40 of returning to the first step S10 when the temperature of the exhaust gas at the upstream of the selective catalyst reduction device 30 reaches a predetermined set target temperature through the third step.

The method may further include a step of determining whether a back pressure of the exhaust gas measured at the upstream of the selective catalyst reduction device in the exhaust gas line reaches a predetermined back pressure and sending a control command to increase the temperature of the exhaust gas when the reduction efficiency of the nitrogen oxides does not reach the predetermined reduction efficiency, but the back pressure reaches a predetermined back pressure.

The procedure may return to the first step S10 when a time reaches a predetermined time even though the temperature of the exhaust gas of the upstream of the selective catalyst reduction device 30 does not reach the predetermined target temperature in the third step.

Other detailed matters of the embodiments are included in the detailed description and the drawings.

Advantageous Effects

According to the exhaust gas post-processing apparatus and the control method therefore according to the present disclosure as described above, whether a solidified reducing agent is deposited in an exhaust gas pipe and a mixer is determined by the increased back pressure of the pressure sensor disposed on the exhaust gas line or the lowered reduction efficiency of nitrogen oxides. This is determined as a case where the exhaust gas post-processing apparatus is not normally operated to perform regeneration of the exhaust gas post-processing apparatus. Consequently, forced regeneration of the exhaust gas post-processing apparatus may be performed by determining whether the back pressure is increased or whether the reduction efficiency of nitrogen oxides becomes poor.

DESCRIPTION OF MAIN REFERENCE NUMERALS OF DRAWINGS

Figure 1:
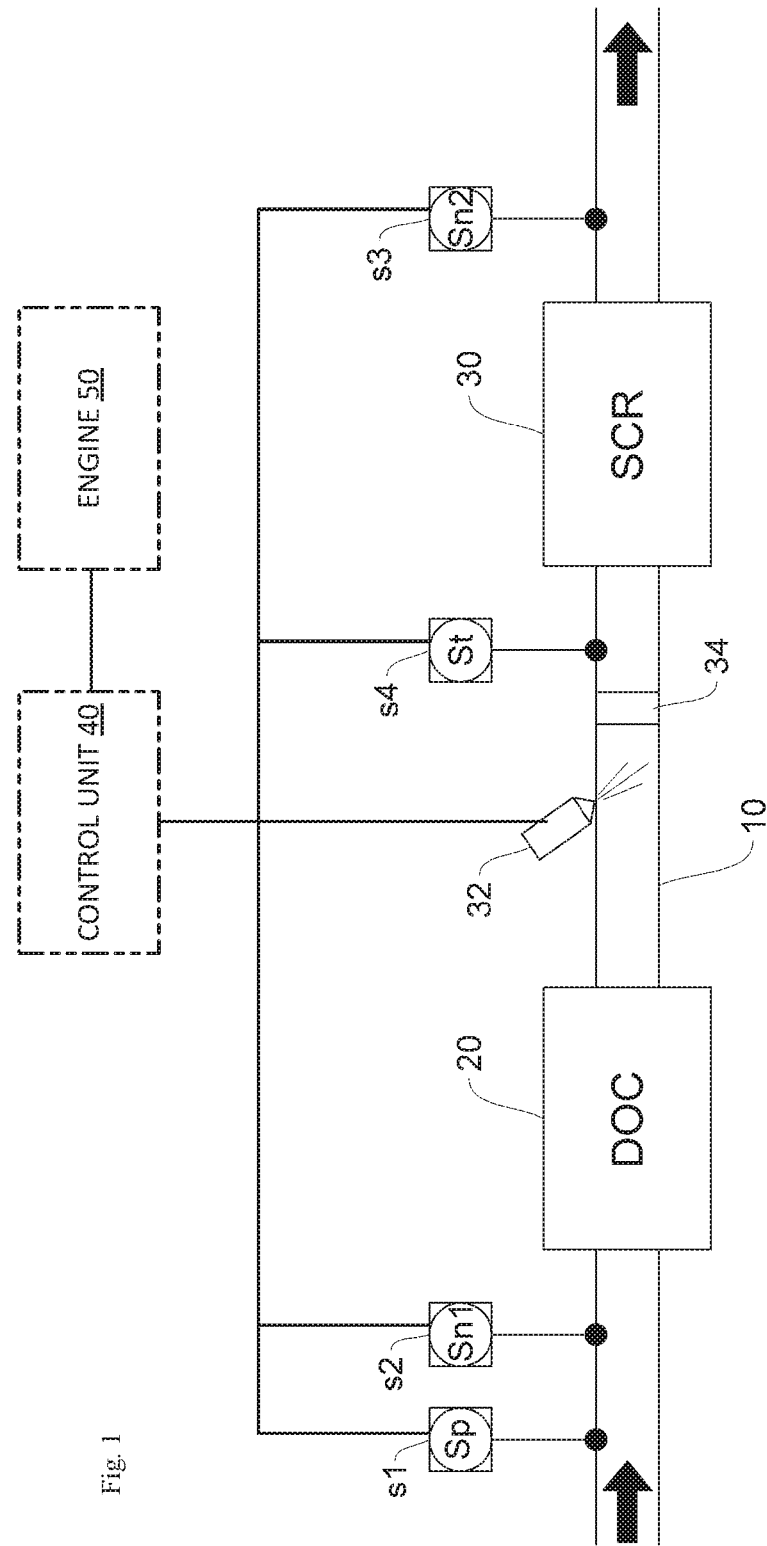
FIG. 1 is a diagram for describing an exhaust gas post-processing apparatus according to an exemplary embodiment of the present disclosure.

10: Exhaust gas line
20: Diesel oxidation catalyst device (DOC)
30: Selective catalyst reduction device (SCR)
32: Dosing module
34: Mixer
S2, S3, S1, S4: first, second, third, and fourth sensors

[Best Mode]

Advantages and characteristics of the present disclosure and a method of achieving the advantages and characteristics will be clear by referring to exemplary embodiments described below in detail together with the accompanying drawings.

Hereinafter, exemplary embodiments of the present disclosure will be described in detail with reference to the accompanying drawings. It should be understood that the exemplary embodiment described below is provided as an example to help the understanding of the present disclosure and the present disclosure may be embodied in various different forms from the exemplary embodiment described herein. Further in the description of the present disclosure, a detailed explanation and specific drawing of known related functions and components may be omitted when it is determined that the detailed description may unnecessarily make the subject matter of the present disclosure obscure. Further, the accompanying drawings are not illustrated according to an actual size but some components may be excessively illustrated for more understanding of the present disclosure.

Further, the terms used in the description are defined considering the function of the present disclosure and may vary depending on the intention or usual practice of a manufacturer. Therefore, the definitions should be made based on the entire contents of the present specification.

Like reference numerals indicate like components throughout the specification.

Hereinafter, an exhaust gas post-processing apparatus according to an exemplary embodiment of the present disclosure and a control method therefore will be described with reference to FIGS. 1 and 2.

Figure 2:
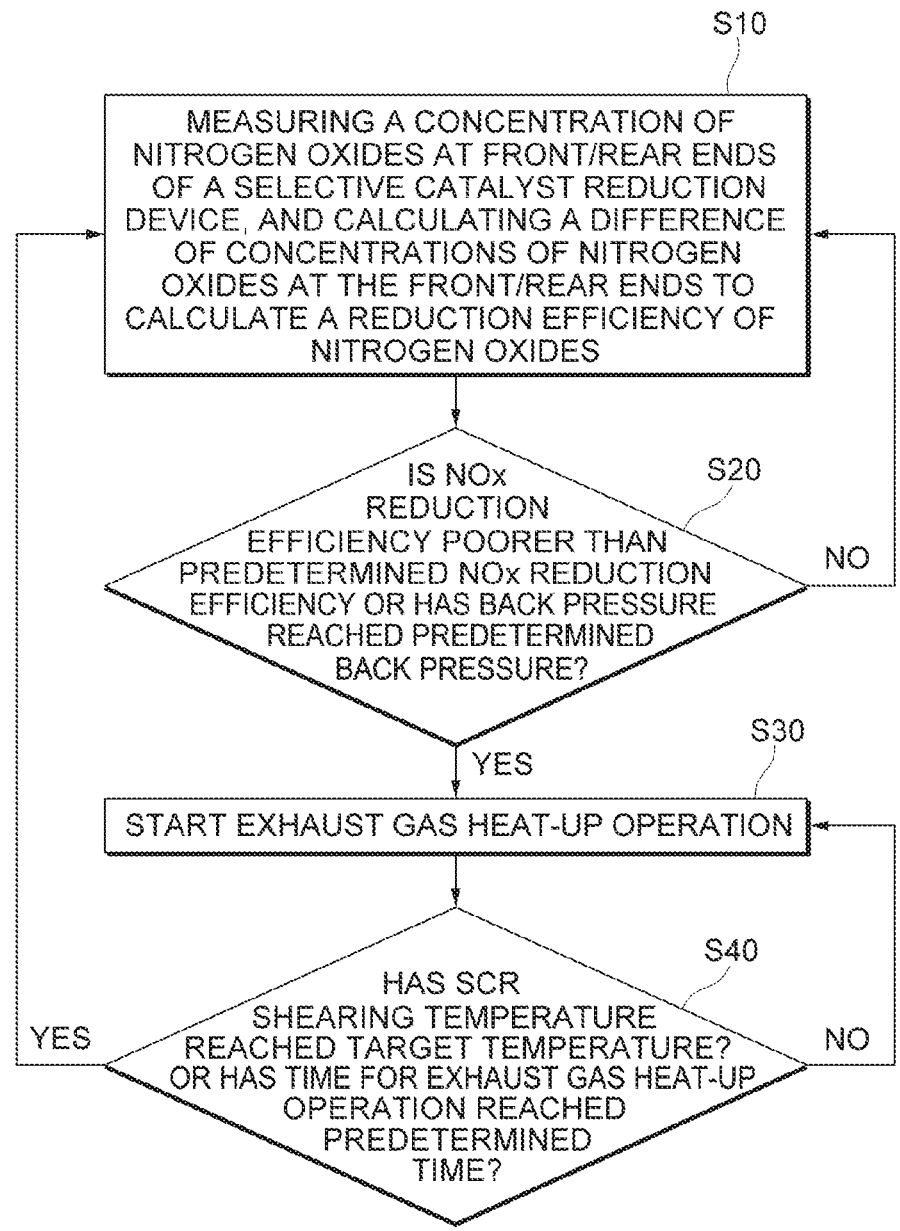
FIG. 2 is a diagram for describing a control method for an exhaust gas post-processing apparatus according to an exemplary embodiment of the present disclosure.

FIG. 1 is a diagram for describing an exhaust gas post-processing apparatus according to an exemplary embodiment of the present disclosure. FIG. 2 is a diagram for describing a control method for an exhaust gas post-processing apparatus according to an exemplary embodiment of the present disclosure.

The exhaust gas post-processing apparatus according to an exemplary embodiment of the present disclosure includes a diesel oxidation catalyst device 20 disposed at an upper stream and a selective catalytic reduction (SCR) device disposed at a lower stream with respect to the flow of exhaust gas in an exhaust gas line 10.

A first sensor S2 is provided at an upstream of the diesel oxidation catalyst device 20. The first sensor S2 measures nitrogen oxides contained in the exhaust gas at the upstream of the diesel oxidation catalyst device 20. That is, the first sensor S2 measures a quantity or a concentration of nitrogen oxides before purifying the exhaust gas. The quantity of the nitrogen oxides is provided to a control unit 40.

A second sensor S3 is provided at a downstream of the selective catalytic reduction device 30 to measure nitrogen oxides contained in the exhaust gas at the downstream of the selective catalytic reduction device 30. That is, the second sensor S2 measures a quantity or a concentration of nitrogen oxides after purifying the exhaust gas. Similarly, the quantity of the nitrogen oxides is provided to the control unit 40.

Additionally, a third sensor S1 is provided at an upstream of the diesel oxidation catalyst device 20. The third sensor S1 measures a pressure of the exhaust gas at the upstream of the diesel oxidation catalyst device 20. The measured pressure value is provided to the control unit 40.

A dosing module 32 is provided at an upstream of the selective catalyst reduction device 30. The dosing module 32 sprays a reducing agent (urea aqueous solution). Further, a mixer 34 may be provided between the dosing module 32 and the selective catalyst reduction device 30. The mixer 34 uniformly mixes the exhaust gas and the reducing agent.

The control unit 40 may calculate a reduction efficiency of nitrogen oxides. When the reduction efficiency of nitrogen oxides is bad, the control unit 40 controls a temperature of the exhaust gas to be increased.

The reduction efficiency of the nitrogen oxides may be expressed by a conversion efficiency of the nitrogen oxides and the conversion efficiency of the nitrogen oxides may be obtained by Equation 1.

$$\text{Nox conversion efficiency} = (NOx_i - NOx_o)/NOx_i * 100\% \quad \text{Equation 1}$$

$NOx_i$: Quantity of nitrogen oxides before flowing exhaust gas into "post-processing apparatus"

$NOx_o$: Quantity of nitrogen oxides after discharging exhaust gas from "post-processing apparatus"

That is, $NOx_i$ is a concentration of a first nitrogen oxides or a quantity of the nitrogen oxides detected by the first sensor S2. Similarly, $NOx_o$ is a concentration of a second nitrogen oxides or a quantity of the nitrogen oxides detected by the second sensor S3. By doing this, the control unit 40 may calculate an efficiency indicating how much nitrogen oxides is reduced, that is, how much nitrogen oxides is converted.

In the meantime, the set reduction efficiency may be set in advance by a manufacturing company and also updated in accordance with the will of the user.

On the other hand, when the set reduction efficiency is assumed to be 80% but the result of Equation 1 does not reach 80%, it is determined that the reduction efficiency of the nitrogen oxides is poorer than a set reduction efficiency. As described above, when the reduction efficiency of the nitrogen oxides is low, the control unit 40 is controlled to increase a temperature of the exhaust gas.

In order to increase the temperature of the exhaust gas, an engine RPM is increased by increasing a quantity of fuel sprayed from an engine 50 or increasing a load of an operating machine, thereby increasing the temperature of the exhaust gas. Further, even though not described herein, those skilled in the art may know how to increase the temperature of the exhaust gas so that detailed description thereof will be omitted.

In the meantime, when the third sensor S1 is normally operated, the control unit 40 controls to increase the temperature of the exhaust gas in accordance with the pressure value obtained from the third sensor S1. That is, when a back pressure on a line of the exhaust gas 10 is increased, it may be determined that somewhere in the exhaust gas post-processing apparatus is blocked to increase the pressure of the exhaust gas.

On the other hand, when the third sensor S1 is not normally operated, the control unit 40 controls to increase the temperature of the exhaust gas in accordance with a reduction efficiency of nitrogen oxides. That is, even though the pressure value of the back pressure is not obtained, the exhaust gas post-processing apparatus and a method therefore according to the exemplary embodiment of the present disclosure may automatically perform a regeneration operation on the exhaust gas post-processing apparatus by referring to the reduction efficiency of nitrogen oxides.

On the other hand, the exhaust gas post-processing apparatus and a control method therefore according to the exemplary embodiment of the present disclosure may further include a fourth sensor S4. The fourth sensor S4 detects a temperature of the exhaust gas at the upstream of the selective catalyst reduction device (SCR). Therefore, the control unit 40 controls to increase the temperature of the exhaust gas until a temperature of the exhaust gas detected in the fourth sensor S4 reaches a target temperature. By doing this, it is determined whether the temperature is developed enough to allow the selective reduction catalyst device 30 to perform regeneration.

When the temperature of the exhaust gas detected by the fourth sensor S4 does not reach the target temperature, the temperature of the exhaust gas is continuously controlled to be increased.

When the temperature of the exhaust gas detected by the fourth sensor S4 reaches the target temperature, the control unit stops controlling to increase the temperature of the exhaust gas. Therefore, the temperature is developed only to regenerate the exhaust gas post-processing apparatus so that the fuel is not additionally consumed.

On the other hand, in the exhaust gas post-processing apparatus and a control method therefore according to the exemplary embodiment of the present disclosure, the control unit 40 controls to increase the temperature of the exhaust gas during a set time. Therefore, it is suppressed to excessively consume the fuel.

Hereinafter, each step of a control method for an exhaust gas post-processing apparatus will be described with reference to FIG. 2.

First step S10: In the first step, a concentration of oxygen or a concentration of nitrogen oxides is sensed at front/rear ends of a selective catalyst reduction device (SCR). That is, the nitrogen oxides is reduced in a general situation without causing a problem. Further, the concentration of oxygen may satisfy a permitted reference value.

Second step S20: In the second step, the exhaust gas post-processing apparatus determines whether a reduction efficiency of nitrogen oxides is poorer than a set reduction efficiency.

Third step S30: In the third step, when the reduction efficiency of the nitrogen oxides is poorer than the set reduction efficiency, the temperature of the exhaust gas is controlled to be increased.

Fourth step S40: In the fourth step, when a temperature at the upstream of the selective catalyst reduction device 30 in the exhaust gas post-processing apparatus reaches a target temperature, the procedure returns to the above-described first step S10.

Therefore, the control method of the exhaust gas post-processing apparatus according to an exemplary embodiment of the present disclosure may automatically regenerate the exhaust gas post-processing apparatus based on the reduction efficiency of the nitrogen oxides.

In the meantime, in the second step S20, it is further determined whether a back pressure formed in an exhaust line reaches a set back pressure. When the back pressure reaches the set back pressure in the second step, the temperature of the exhaust gas is controlled to be increased in the third step S30.

Therefore, the control method for the exhaust gas post-processing apparatus according to the exemplary embodiment of the present disclosure may calculate a reduction efficiency of nitrogen oxides or measure the back pressure. Even though one of the above two ways is not normally functioned, the exhaust gas post-processing apparatus may be automatically regenerated based on the other one.

On the other hand, in the fourth step S40, when a time to control the temperature of the exhaust gas to be increased reaches the set time, the procedure may return to the first step S10. A time to increase the temperature of the exhaust gas may be expected. For example, since information such as a spraying quantity of fuel, a mixture ratio of air and fuel or an enthalpy of the fuel may be achieved, as described above, it is possible to expect how much time is consumed.

The control unit 40 sets a desired time as a setting time. By doing this, the temperature of the exhaust gas is controlled to be increased only by the set time, which may suppress the fuel from being excessively consumed.

In the exhaust gas post-processing apparatus and the control method therefore according to an exemplary embodiment of the present disclosure, even though a pressure sensor disposed in the exhaust gas line is not normally operated, if the reduction efficiency of the nitrogen oxides is low, it is determined that the exhaust gas post-processing apparatus is not normally operated and the exhaust gas post-processing apparatus is regenerated. Specifically, forced regeneration of the exhaust gas post-processing apparatus may be performed by determining whether the back pressure is increased or whether the reduction efficiency of nitrogen oxides becomes poor.

The exemplary embodiments of the present disclosure have been described with reference to the accompanying drawings, but those skilled in the art will understand that the present disclosure may be implemented in another specific form without changing the technical spirit or an essential feature thereof.

Accordingly, it will be understood that the aforementioned exemplary embodiments are described for illustration in all aspects and are not limited, and the scope of the present disclosure shall be represented by the claims to be described below, and it should be interpreted that all of the changes or modified forms induced from the meaning and the scope of the claims, and an equivalent concept thereof are included in the scope of the present disclosure.

INDUSTRIAL APPLICABILITY

The exhaust gas post-processing apparatus and a control method therefore according to the present disclosure may be used to automatically regenerate the exhaust gas post-processing apparatus.

The invention claimed is:

1. An exhaust gas post-processing apparatus comprising:
a selective catalyst reduction device provided in an exhaust gas line;
a diesel oxidation catalyst device disposed at an upper stream than the selective catalyst reduction device;
a first sensor provided at an upstream of the diesel oxidation catalyst device to measure nitrogen oxides contained in the exhaust gas;
a second sensor provided at a rear end of the selective catalyst reduction device to measure nitrogen oxides contained in the exhaust gas;
a third sensor provided at the upstream of the diesel oxidation catalyst device to measure a back pressure value of the exhaust gas;
a fourth sensor which detects a temperature of the exhaust gas at the upstream of the diesel oxidation catalyst device; and
a control unit is configured to:
calculate a reduction efficiency of nitrogen oxides by comparing a difference between a concentration of the nitrogen oxides detected in the first sensor and a concentration of the nitrogen oxides detected in the second sensor;
control an engine to increase the temperature of the exhaust gas when the reduction efficiency is lower than a predetermined reduction efficiency;
return to calculate the reduction efficiency of nitrogen oxides by comparing the difference between a concentration of the nitrogen oxides detected in the first sensor and the concentration of the nitrogen oxides detected in the second sensor when the temperature of the exhaust gas at the upstream of the diesel oxidation catalyst device reaches a predetermined target temperature through the controlling the engine; and
determine whether the back pressure of the exhaust gas measured at the upstream of the diesel oxidation catalyst device in the exhaust gas line reaches a predetermined back pressure and further control the engine to increase the temperature of the exhaust gas when the back pressure reaches the predetermined back pressure when the reduction efficiency of the nitrogen oxides does not reach the predetermined reduction efficiency.

2. The apparatus of claim 1, wherein the control unit is configured to control the engine to increase the temperature of the exhaust gas during a predetermined time.

3. The apparatus of claim 1, wherein the control unit is further configured to increase the temperature of the exhaust gas in accordance with a reduction efficiency of the nitrogen oxides when the third sensor is not normally operated.

4. A control method for an exhaust gas post-processing apparatus, the method comprising:
measuring a concentration of nitrogen oxides at an upstream of a diesel oxidation catalyst device and a rear end of a selective catalyst reduction device, wherein the diesel oxidation catalyst device is disposed at an upper stream than the selective catalyst reduction device, and calculating a difference of the concentrations of nitrogen oxides at the upstream of the diesel oxidation catalyst device and the rear end of the selective catalyst reduction device to calculate a reduction efficiency of nitrogen oxides;
comparing the calculated reduction efficiency of nitrogen oxides with a predetermined reduction efficiency; and controlling an engine to increase a temperature of the exhaust gas when the reduction efficiency of nitrogen oxides is lower than the predetermined reduction efficiency;

returning to the measuring the concentration of nitrogen oxides and the calculating the difference of the concentrations of nitrogen oxides at the upstream of the diesel oxidation catalyst device and the rear end of the selective catalyst reduction device when the temperature of the exhaust gas at the upstream of the diesel oxidation catalyst device reaches a predetermined target temperature through the controlling the engine; and determining whether a back pressure of the exhaust gas measured at the upstream of the diesel oxidation catalyst device in the exhaust gas line reaches a predetermined back pressure and further controlling the engine to increase the temperature of the exhaust gas when the back pressure reaches the predetermined back pressure when the reduction efficiency of the nitrogen oxides does not reach the predetermined reduction efficiency.

5. The method of claim 4, wherein the returning to the measuring the concentration of nitrogen oxides at a predetermined time when the temperature of the exhaust gas of the upstream of the diesel oxidation catalyst device does not reach the predetermined target temperature in the controlling the engine to increase the temperature of the exhaust gas when the reduction efficiency of nitrogen oxides is lower than the predetermined reduction efficiency.

6. The method of claim 4, wherein the back pressure of the exhaust gas is measured by a pressure sensor, and the method further comprising controlling the engine to increase the temperature of the exhaust gas in accordance with a reduction efficiency of the nitrogen oxides when the pressure sensor is not normally operated.

* * * * *